United States Patent
Lee

(10) Patent No.: US 10,928,903 B2
(45) Date of Patent: Feb. 23, 2021

(54) METHOD AND APPARATUS FOR DISPLAY CONTROL USING EYE TRACKING

(71) Applicant: LG ELECTRONICS INC., Seoul (KR)

(72) Inventor: Jae Myung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/566,771

(22) Filed: Sep. 10, 2019

(65) Prior Publication Data

US 2020/0004333 A1    Jan. 2, 2020

(30) Foreign Application Priority Data

Jun. 20, 2019  (KR) .......................... 10-2019-0073472

(51) Int. Cl.
| | | |
|---|---|---|
| G06F 3/01 | (2006.01) | |
| G06K 9/00 | (2006.01) | |
| G06T 7/50 | (2017.01) | |
| G06F 3/0484 | (2013.01) | |
| G06F 3/0481 | (2013.01) | |
| G06T 7/20 | (2017.01) | |

(52) U.S. Cl.
CPC .......... G06F 3/013 (2013.01); G06F 3/04817 (2013.01); G06F 3/04845 (2013.01); G06K 9/00221 (2013.01); G06K 9/00597 (2013.01); G06T 7/20 (2013.01); G06T 7/50 (2017.01); G06T 2207/20081 (2013.01); G06T 2207/30201 (2013.01)

(58) Field of Classification Search
CPC .. G06F 3/013; G06F 3/04845; G06F 3/04817; G06T 7/50; G06T 7/20; G06T 2207/30201; G06T 2207/20081; G06K 9/00281; G06K 9/00597; G06K 9/00221
See application file for complete search history.

(56) References Cited

U.S. PATENT DOCUMENTS

| | | | |
|---|---|---|---|
| 8,957,847 B1* | 2/2015 | Karakotsios | G06F 3/013 |
| | | | 345/156 |
| 2012/0256967 A1* | 10/2012 | Baldwin | G06F 3/0485 |
| | | | 345/684 |

(Continued)

FOREIGN PATENT DOCUMENTS

| | | |
|---|---|---|
| KR | 1020140104661 | 8/2014 |
| KR | 1020190020633 | 3/2019 |

*Primary Examiner* — Muhammad N Edun
(74) *Attorney, Agent, or Firm* — Lee, Hong, Degerman, Kang & Waimey

(57) ABSTRACT

The present disclosure discloses a display control method and control apparatus using eye tracking. The display control method includes matching the image on which the user's face is displayed with the image on which its gaze is displayed, respectively, detecting the gaze information of the user by using the matched image with respect to the input of the user's face image, and controlling a display by manipulating a control element related to the gaze information among the control elements included in display information. According to the present disclosure, it is possible to control the display by using Artificial Intelligence (AI), a Deep Learning-based gaze mapping technology, and a 5G network without complicated calculation for a gaze angle.

15 Claims, 12 Drawing Sheets

(56) References Cited

U.S. PATENT DOCUMENTS

2015/0055821 A1\* 2/2015 Fotland .................. G06T 7/246
                                                    382/103
2018/0125404 A1\* 5/2018 Bott .................. H04N 5/23293

\* cited by examiner

WHEN VIEWING FRONT

WHEN VIEWING RIGHT SIDE

WHEN VIEWING LEFT SIDE

HEAD RIGHT MOVEMENT

HEAD LEFT MOVEMENT

METHOD AND APPARATUS FOR DISPLAY CONTROL USING EYE TRACKING

CROSS-REFERENCE TO RELATED APPLICATION

Pursuant to 35 U.S.C. § 119(a), this application claims the benefit of earlier filing date and right of priority to Korean Patent Application No. 10-2019-0073472, filed on Jun. 20, 2019, the contents of which are hereby incorporated by reference herein in its entirety.

BACKGROUND

1. Technical Field

The present disclosure relates to a display control method and a display control apparatus using eye tracking, and more particularly, to a display control method using a Deep Learning-based gaze mapping technique and a display control apparatus using the same.

2. Description of Related Art

At the present moment in the evolution of a computer, a keyboard and a mouse correspond to the most common computer input apparatus. Even in portable devices such as a laptop computer, a tablet computer, and a smart phone, input devices such as a keyboard and a mouse-like touch pad and touch screen are mainly used.

In the fourth industrial revolution, humans are expected to more conveniently control a machine through voice-based input/output interfaces. A control of the display apparatus using the gaze of the person, which was presented in the movie, has been already close to our current life by the eye tracking technology.

An apparatus and a method for adjusting brightness for each region of a display based on eye tracking are disclosed by a Patent Document 1. According to the Patent Document 1, disclosed is that a video analysis method, a contact lens method, and a sensor attaching method may be introduced, the movement of a pupil may be detected, and the position of the eye point may be calculated by using corneal reflection. However, there is a problem in the Patent Document 1 in that an expensive equipment for measuring corneal reflex is required, it is inconvenient for the user to wear the equipment for measuring the pupil and precise measurement is difficult.

In addition, a user interface method and apparatus using gaze tracking are disclosed by a Patent Document 2. According to the Patent Document 2, the intersection point of the first optical axis and the second optical axis is extracted, and the intersection point is set as the eye point on the screen. However, there are problems in that accurate calculation of the first and second optical axes is difficult, and when the calculated optical axes are in error, the eye point cannot be set on the screen.

RELATED ART DOCUMENTS

Patent Documents (Patent Document 1) Korean Patent Laid-Open Publication No. 10-2019-0020633 (published on Mar. 4, 2019)
(Patent Document 2) Korean Patent Laid-Open Publication No. 10-2014-0104661 (published on Aug. 29, 2014)

SUMMARY OF THE DISCLOSURE

An object of the present disclosure is to implement an eye tracking technology, which has been implemented by using the conventional expensive program and equipment, through a simple equipment and a public program.

Another object of the present disclosure is to provide a display control method for automatically performing an eye tracking operation, which has been performed according to the conventional control by a person.

Still another object of the present disclosure is to provide a display control method capable of overcoming the limitation of the eye tracking technology that has been applied to only the conventional simple display control and controlling the operation of the window.

The objects of the present disclosure are not limited to the objects described above, and other objects and advantages not described of the present disclosure may be understood by the following description and will be understood more reliably by an embodiment of the present disclosure. In addition, it will be understood that the objects and the advantages of the present disclosure may be realized by the means recited in claims and a combination thereof.

A display control method using eye tracking according to an embodiment of the present disclosure for achieving the objects can be performed by a display control apparatus.

A display control method using eye tracking may be configured to include generating data for learning an Artificial Intelligence model, learning an Artificial Intelligence model by using the learning data, tracking the user's gaze with respect to the input of the user's face image based on the learned Artificial Intelligence model, and controlling a display according to the user's gaze.

The display control method using eye tracking may be configured to include matching a plurality of user images having photographed the user's face with a plurality of images on which the user's gaze is displayed, respectively, detecting the gaze information of the user on the screen of a display through the analysis of the plurality of matched images with respect to the input of the user's face image watching the screen of the display, and controlling the display by manipulating a control element related to the gaze information among the control elements included in display information.

In addition, the user image may include at least one of the distance information between the user and the screen of the display, the shape of the user's face or the information on the shapes of the left eye and right eye pupils of the user.

In addition, the detecting the gaze information of the user may use an Artificial Intelligence model learned according to an Artificial Intelligence algorithm, and the Artificial Intelligence model may detect the gaze information of the user by using the distance information between the user and the screen of the display, the shape of the user's face and the information on the shapes of the left eye and right eye pupils of the user through training based on the plurality of matched images.

In addition, the Artificial Intelligence model may learn by matching the gaze information of the user moving in interlock with the cursor of a mouse on the screen of the display, and at least one of the shape of the user's face and the shapes of the left eye and right eye pupils of the user watching the cursor of the mouse, and may track the user's gaze with respect to the input of the user's face image through the learning.

In addition, the display information may include window User Interface (UI) information, and the controlling the display may include controlling the brightness of the window disposed in a gaze area by using the window UI information.

In addition, the display information may include window User Interface (UI) information, and the controlling the display may include controlling the switching of an active window among a plurality of windows by using the window UI information.

In addition, the display information may include window User Interface (UI) information, and the controlling the display may include controlling the switching of an active window in the maximum size state by using the window UI information.

In addition, the display information may include window User Interface (UI) information, and the controlling the display may include controlling the shape of a window by using a window control icon among the window UI information.

In addition, a user's wink may be used as a user's input for window control.

A display control apparatus using eye tracking according to an embodiment of the present disclosure may include a controller for controlling an image processing, tracking gaze by using the processed image, and controlling a display by using gaze information according to eye tracking and a memory for storing an image processing program readable by a computer, an Artificial Intelligence program, and a display drive driver, and The controller includes a processor for matching a plurality of user images having photographed the user's face with a plurality of images on which the user's gaze is displayed through the image processing program, respectively, detecting the gaze information of the user on the screen of a display through the analysis of the plurality of matched images with respect to the input of the user's face image watching the screen of the display, and controlling the display by manipulating a control element related to the gaze information among the control elements included in display information through the display drive driver.

In addition, the user image may include at least one of the distance information between the user and the screen of the display, the shape of the user's face or the information on the shapes of the left eye and right eye pupils of the user.

In addition, the processor may learn an Artificial Intelligence model according to an Artificial Intelligence algorithm, and the Artificial Intelligence model may detect a gaze reaching area of the user by using the distance information between the user and the screen of the display and the information on the shape of the user's face and the shapes of the left eye and right eye pupils of the user through training based on the plurality of matched images.

In addition, the Artificial Intelligence model may learn by matching the gaze information of the user moving in interlock with the cursor of a mouse on the screen of the display, and at least one of the shape of the user's face and the shapes of the left eye and right eye pupils of the user watching the cursor of the mouse, and track the user's gaze with respect to the input of the user's face image through the learning.

In addition, the processor may control a window according to the input of a user's wink.

In addition, the processor may generate data for learning the Artificial Intelligence model tracking the user's gaze by matching a display screen image on which the user's gaze is displayed by the movement of the cursor of a mouse with the image of the user's face watching the cursor of the mouse.

According to the present disclosure, it is possible to achieve the eye tracking technology by using the simple equipment and the public programming interface.

In addition, it is possible to control the display by using the Deep Learning-based gaze mapping technology even without the complicated calculation for the gaze angle.

In addition, it is possible to track the gaze by using the camera without the hassle of wearing equipment on the person's body.

An object of the present disclosure may not only simply control the brightness of the display but also control the operation of the window on the screen of the display.

BRIEF DESCRIPTION OF THE DRAWINGS

The foregoing and other aspects, features, and advantages of the disclosure, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
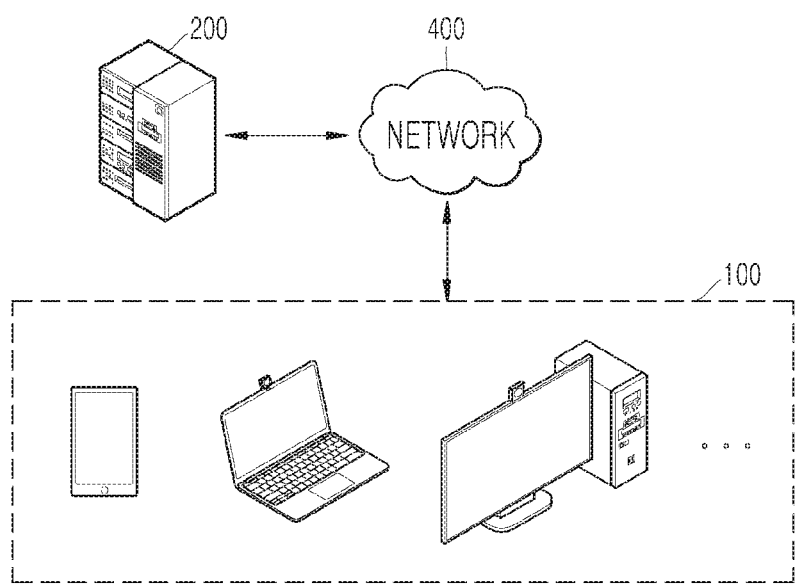
FIG. 1 is an exemplary diagram of a system environment including a user terminal including a display control apparatus according to an embodiment of the present disclosure, a server, and a network for communicatively connecting them.

Hereinafter, the embodiments disclosed in the present specification will be described in detail with reference to the accompanying drawings, the same or similar elements regardless of a reference numeral is denoted by the same reference numeral and a duplicate description thereof will be omitted. The suffixes "module" and "unit" for the element used in the following description are given or mixed considering only ease of writing specification, and do not have their own meaning or role. In addition, in relation to describing the present disclosure, when the detailed description of the relevant known technology is determined to unnecessarily obscure the gist of the present disclosure, the detailed description may be omitted. In addition, it should be understood that the accompanying drawings are merely for easily understanding the embodiments disclosed in the present disclosure, the technical spirit disclosed in the present specification is not limited by the accompanying drawings, and they include all changes, equivalents or alternatives included in the spirit and the technical scope of the present disclosure.

Although the terms including ordinal such as first, second, etc. may be used to describe various elements, these elements should not be limited by these terms. These terms may be only used to distinguish one element from another element.

It should be understood that when an element is referred to as being "connected to," or "coupled to" another element, it may be directly connected or coupled to the other element, but intervening elements may also be present. In contrast, it should be understood that when an element is referred to as being "directly connected to," or "directly coupled to" another element, there may be no intervening elements present.

Eye tracking is a technique of tracking the position of the eye by sensing the movement of the eyes, and three methods of a video analysis method, a contact lens method, and a sensor attachment method are mainly used according to the type of the device.

The video analysis method detects the movement of the pupil through the real-time analysis of camera images, and calculates the direction of the gaze based on the fixed position reflected on the cornea. This calculation method is referred to as Pupil Center Cornea Reflection (PCCR).

The contact lens method uses the reflected light of a mirror built-in contact lens, or the magnetic field of a coil built-in contact lens, and has low convenience but high accuracy.

The sensor attachment method attaches a sensor around the eye to use the magnetic field according to the movement of the eye, and detects the movement of the eye even when the eye is closed.

The eye tracking according to an embodiment of the present disclosure corresponds to a video analysis method, but is a method for avoiding the complicated operation according to the related art, and tracking the user's gaze by using an Artificial Intelligence algorithm.

FIG. 1 is an exemplary diagram of a system environment including a user terminal including a display control apparatus according to an embodiment of the present disclosure, a server, and a network for communicatively connecting them.

Referring to FIG. 1, various types of user terminals 100 and a server 200 are communicatively connected via a network 400. The user terminal 100 may use the server 200 for use in the user's eye tracking. For example, the user terminal 100 may use by directly generating a plurality of user images photographing the user's face and a plurality of images on which the user's gaze simultaneously collected is displayed, but also may use the data of the big data type collected by the server 200 instead.

The user terminal 100 may use various programs related to the Artificial Intelligence algorithms stored in a local area or stored in the server 200. That is, the server 200 may serve to learn the Artificial Intelligence model by using the collected data together with the data collection. The user terminal 100 controls the display by using the eye tracking based on the generated Artificial Intelligence model.

Figure 2:
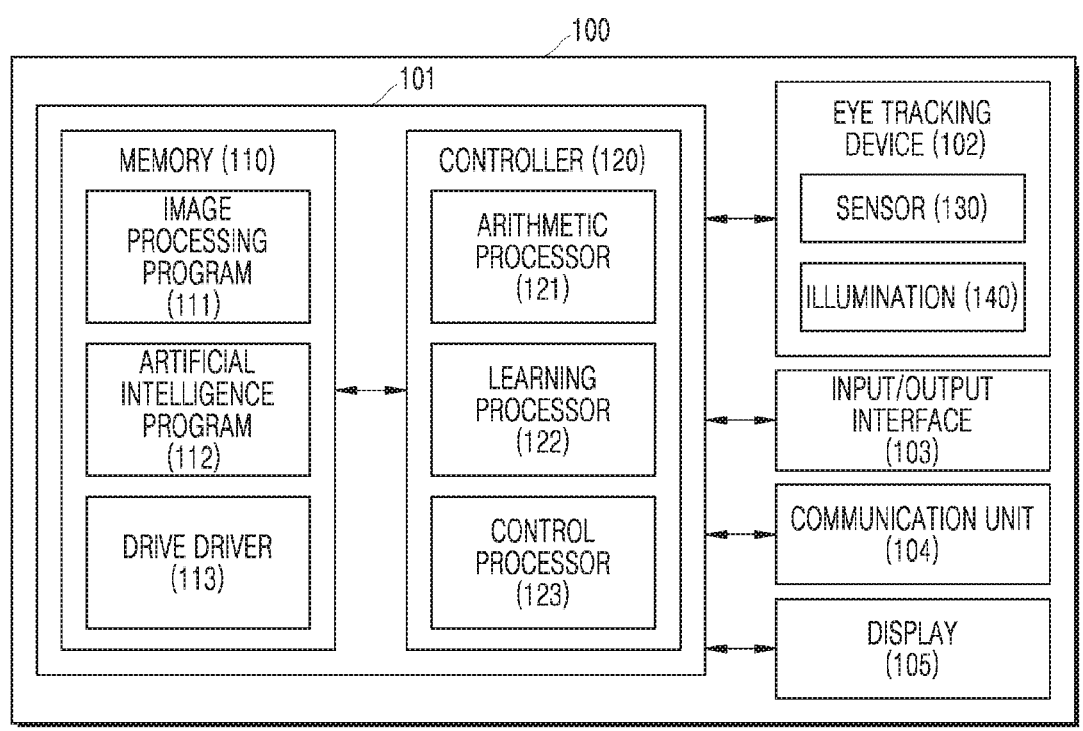
FIG. 2 is a block diagram of the display control apparatus according to an embodiment of the present disclosure.

FIG. 2 is a block diagram of a display control apparatus according to an embodiment of the present disclosure.

Referring to FIG. 2, a display control apparatus 101 using eye tracking according to an embodiment of the present disclosure may be configured by itself, and configured in the form of the user terminal 100 including a display 105. The user terminal 100 basically includes an imaging apparatus including a sensor for tracking the user's gaze, for example, an image sensor 130 and the display 105 to be controlled. However, the user terminal 100 may control the display by using an independent external imaging apparatus instead of the imaging apparatus included therein.

The user terminal 100 may be a terminal for performing at least one of wired communication and wireless communication. Various embodiments of the wireless terminal may include not only a cellular telephone, a smart phone with wireless communication function, a personal digital assistant (PDA) with wireless communication function, a wireless modem, a portable computer with wireless communication function, a photography apparatus such as a digital camera with wireless communication function, a gaming apparatus with wireless communication function, a music storage and playback appliance with wireless communication function, an internet appliance capable of wireless internet access and browsing but also a portable unit or terminals integrating combinations of these functions, but are not limited thereto.

The user terminal 100 may perform an Artificial Intelligence (AI) assistant function. The Artificial Intelligence assistant recognizes the user's voice, outputs the response suitable for the recognized user's voice through a voice, or operates the user terminal according to the recognized user's voice.

The server 200 may provide the user terminal 100 with training data necessary for tracking the gaze by using the Artificial Intelligence algorithm and various programs related to the Artificial Intelligence algorithm, for example, an API, a workflow, etc. That is, the server 200 may learn the Artificial Intelligence model by using the training data including the user image necessary for eye tracking and the images on which the user's gaze is displayed. In addition, the server 200 may evaluate the Artificial Intelligence model, and update the Artificial Intelligence model for better performance even after evaluation. Herein, the user terminal 100 may perform a series of steps performed by the server 200 alone or together with the server 200.

The network 400 may be a wired and wireless network, for example a local area network (LAN), a wide area network (WAN), an internet, an intranet, and an extranet, and a mobile network, for example, any appropriate communication network including cellular, 3G, LTE, 5G, WiFi networks, an ad hoc network, and a combination thereof.

The network 400 may include connections of network elements such as a hub, a bridge, a router, a switch, and a gateway. The network 400 may include one or more connected networks including a public network such as the internet and a private network such as a secure corporate private network, for example, a multi-network environment. Access to the network 400 may be provided via one or more wired or wireless access networks. Hereinafter, the display control apparatus 100 according to an embodiment of the present disclosure will be described in detail.

Referring back to FIG. 2, the display control apparatus 101 may be configured to include a memory 110 and a controller 120. The display control apparatus 101 may be implemented in the form of various user terminals 100. Then, the user terminal 100 may be configured to include the display control apparatus 101, an eye tracking device 102, an input/output interface 103, a communication unit 104, and a display panel 105.

The memory 110 may be configured to include a volatile memory and a nonvolatile memory as its type. The nonvolatile memory may be used as a storage apparatus. At least one software may be stored in the memory 110. The software may include an operating system, a system program, and various application programs. The memory 110 may be configured to store an image processing program 111, an Artificial Intelligence program 112 for use in eye tracking, and a display drive driver 113.

The image processing program 111 may be configured to include a command necessary for performing the image matching for matching the user's image with the image to which the user's gaze is displayed, respectively, and the image optimization.

The Artificial Intelligence program 112 may be configured to include a command necessary for detecting the user's gaze information on the screen of the display through a plurality of matched image analyses. Specifically, the Artificial Intelligence program 112 may be configured to include an Artificial Intelligence algorithm, for example, a Deep Learning-related computer program that is an area of Machine Learning.

The display drive driver 113 may be configured to include a command necessary for controlling the display by manipulating a control element related to the gaze information.

The controller 120 may be configured to include an arithmetic processor 121. In addition, the controller 120 may further include a function-specific learning processor 122 and a control processor.

The arithmetic processor 121 may perform an operation of matching the user's image with the images on which the user's gaze is displayed, respectively, an operation of detecting the user's gaze information on the screen of the display through the plurality of matched image analyses, and an operation of controlling the display by manipulating the control element related to the gaze information. Among them, the learning processor 122 may perform an operation of detecting the user's gaze information on the screen of the display through the plurality of matched image analyses by using the Artificial Intelligence algorithm, for example, Deep Learning.

In addition, the control processor 122 may control the display by manipulating the control element related to the gaze information.

The display control apparatus 101 according to an embodiment of the present disclosure may control the display 105 by using the eye tracking device 102. Herein, the eye tracking device 102 may be configured to include a sensor 130 and an illumination 140.

The sensor 130 may be configured to include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., camera), a microphone, a battery gauge, an environmental sensor (e.g., a barometer, a hygrometer, a thermometer, a radiation sensor, a thermal sensor, a gas sensor, etc.), and a chemical sensor (e.g., an electronic nose, a healthcare sensor, a biometric sensor, etc.).

The illumination 140 may be configured to include at least one of an infrared LED and a visible light LED. In addition, the LED included in the display 105 may be used as illumination instead even without additional infrared or visible light LED.

The input/output interface 103 is an interface for receiving input from an external device, or for outputting to the external device. The input interface may be configured to include various input terminals and a microphone. The output interface may be configured to include various output terminals and a speaker.

The user terminal 100 may be configured to include the input/output interface 103 and a communication unit 104.

The communication unit 104 may be configured to include at least one of a mobile communication module and a wireless internet module. In addition, the communication unit 104 may further include a near-field communication module.

The mobile communication module may transmit and receive the wireless signal to and from at least one among a base station, an external terminal, and a server on the mobile communication network implemented according to technology standards or communication methods for mobile communication (e.g., Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), 5G mobile communication, etc.).

The wireless internet module refers to a module for wireless internet access, and may be embedded in the user terminal 100 or externally. The wireless internet module is configured to transmit and receive the wireless signal in a communication network according to wireless internet technologies.

The various user terminals 100 may transmit and receive data to and from the server 200 via the 5G network. Particularly, the user terminal 100 may perform data communication with a dialect phoneme adaptation learning system 200 by using at least one service among an Enhanced Mobile Broadband (eMBB), Ultra-reliable and low latency communications (URLLC), and Massive Machine-type communications (mMTC) via the 5G network.

The Enhanced Mobile Broadband (eMBB) is a mobile broadband service, and provides multimedia contents, wireless data access, etc. In addition, more improved mobile services such as hotspot and broadband coverage for accommodating the explosively growing mobile traffic may be provided via eMBB. The large-volume traffic may be accommodated in the area where user mobility is low and its density is high through the hotspot. The wide and stable wireless environment and the user mobility may be guaranteed via the broadband coverage.

The Ultra-reliable and low latency communications (URLLC) service defines the requirement that are far more stringent than existing LTE in terms of reliability and transmission delay of data transmission and reception, and corresponds to the 5G service for production process automation in the industrial field, telemedicine, remote surgery, transportation, safety, etc.

The Massive Machine-type communications (mMTC) is a transmission delay-insensitive service that requires a relatively small amount of data transmission. A much larger number of terminals, such as sensors, than a general portable phone may be connected to a wireless access network by mMTC at the same time. In this case, the communication module price of the terminal should be inexpensive, and there is a need for improved power efficiency and power saving technology capable of operating for years without battery replacement or recharging.

The display 105 corresponds to a target to be controlled by the display control apparatus 101. The screen of the display 105 may be controlled by manipulating the control element of the display 105 related with the gaze information, as one of the components of the user terminal 100. In addition, the display 105 may be a device independently from the user terminal 100 and the display control apparatus 101, for example, a TV. In this case, the ON/OFF of the TV power source may be controlled according to the gaze information of the user.

In addition, a power module not shown in FIG. 2 may be additionally included in the user terminal 100.

Figure 3:
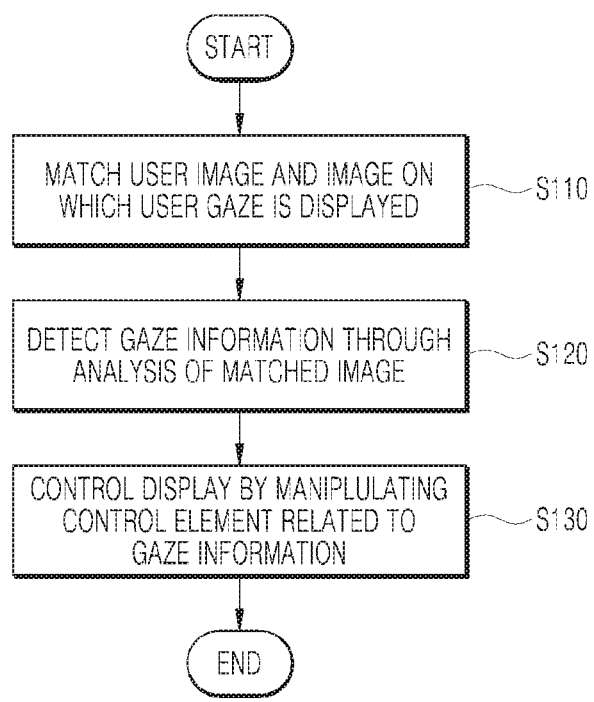
FIG. 3 is a flowchart of a display control method according to an embodiment of the present disclosure.

FIG. 3 is a flowchart of a display control method according to an embodiment of the present disclosure.

Referring to FIG. 3, a display control method S100 using eye tracking according to an embodiment of the present disclosure may be configured to include S110 to S130. Each of the steps described herein may be performed by the display control apparatus 101 or the user terminal 100 including the same alone or in interlock with the server 200.

Firstly, a plurality of user images photographing the user's face and a plurality of images on which the user's gaze is displayed are matched, respectively S110. For example, the plurality of user images photographing the user's face may be collected through a webcam mounted on a laptop computer or a desktop PC corresponding to the user terminal 100 shown in FIG. 1. The plurality of images on which the user's gaze is displayed may be generated by using the movement of the cursor of a mouse. The cursor of the mouse is controlled to move on the screen of the display 105 at various speeds and directions according to a predetermined program. The user watches the moving cursor of the mouse, and the user's gaze is displayed on the screen of the display along the trajectory of the mouse. When the user watches the moving cursor of the mouse, the user images and the gaze images may be acquired at the same time zone.

The user image may include at least one of the distance information between the user and the screen of the display, the shape of the user's face or the information on the shapes of the left eye and right eye pupils of the user.

Next, the user's gaze information on the screen of the display is detected through a plurality of matched image analyses with respect to the user's face image input watching the screen of the display S120.

The display control apparatus 101 may detect the user's gaze information from the input image of the user's face by using the Artificial Intelligence model learned according to the Artificial Intelligence algorithm. Then, the Artificial Intelligence model may detect the user's gaze information by using the distance information between the user and the screen of the display, the shape of the user's face, and the information on the pupil shapes of the left eye and the right eye of the user through the training based on the plurality of matched images.

Finally, the display control apparatus 101 controls the display by manipulating the control element related to the gaze information among the control elements included in the display information S130. Herein, the display information may include window User Interface (UI) information.

The display control apparatus 100 may control the brightness of the window disposed in the gaze area by using the window UI information, control the switching of the active window among the plurality of windows, particularly, control the switching of the active window in the maximum size state, and control the shape of the window by using a window control icon. In addition, the display control apparatus 100 may control the ON/OFF of the TV power source when the gaze is not sensed by tracking the user's gaze.

Figure 4:
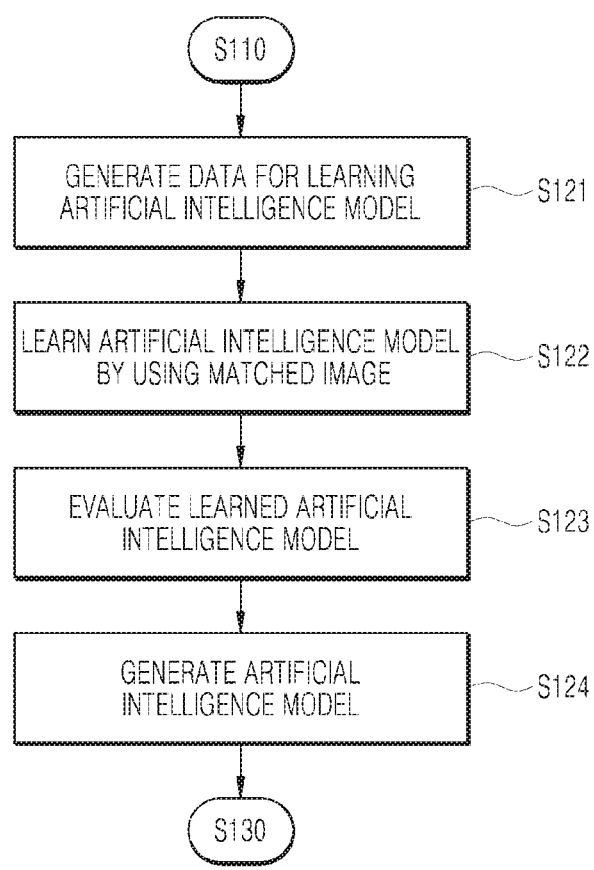
FIG. 4 is a detailed flowchart of S120 of FIG. 3.

FIG. 4 is a detailed flowchart of S120 in FIG. 3.

Referring to FIG. 4, a process of learning the Artificial Intelligence model for tracking the user's gaze, which may be included in the S120, is shown. The learning of the Artificial Intelligence model may be performed in any one form of supervised learning, unsupervised learning, and reinforcement learning.

Learning data of the Artificial Intelligence model is generated through the matching between the user images and the gaze images S121.

An artificial neural network such as the Artificial Intelligence model, for example, a CNN learns the features of the user's face, left eye, and right eye when the gaze images are generated through the supervised learning S122. The user's gaze area and the user's features at this time can be matched with each other through the learning of the matched images in the situation where the distance between the user and the screen of the display 105, the size of the screen of the display 105, the size of the user's face, the direction of the user's face, etc. are changed variously.

The Artificial Intelligence model is generated through the evaluation of the learned Artificial Intelligence model S123 S124.

According to an embodiment of the present disclosure, the display control apparatus 101 may track the user's gaze from the image of the user's face input by using the Artificial Intelligence model. The Artificial Intelligence model will be described below.

Artificial intelligence (AI) is an area of computer engineering science and information technology that studies methods to make computers mimic intelligent human behaviors such as reasoning, learning, self-improving, and the like.

In addition, Artificial Intelligence does not exist on its own, but is rather directly or indirectly related to a number of other fields in computer science. In recent years, there have been numerous attempts to introduce an element of AI into various fields of information technology to solve problems in the respective fields.

Machine learning is an area of Artificial Intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from inputted data.

Numerous machine learning algorithms have been developed for data classification in machine learning. Representative examples of such machine learning algorithms for data classification include a decision tree, a Bayesian network, a support vector machine (SVM), an Artificial Neural Network (ANN), and so forth.

Decision tree may include an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modeled after the mechanism of biological neurons and interneuron connections, in which a number of neurons, referred to as nodes or processing elements, are interconnected in layers.

ANNs are models used in machine learning and may include statistical learning algorithms conceived from biological Neural Networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'Artificial Neural Network' and 'Neural Network' may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep Neural Network (DNN), a recurrent Neural Network (RNN), a bidirectional recurrent deep Neural Network (BRDNN), a multilayer perception (MLP), and a convolutional Neural Network (CNN).

An ANN may be classified as a single-layer Neural Network or a multi-layer Neural Network, based on the number of layers therein.

In general, a single-layer Neural Network may include an input layer and an output layer.

In general, a multi-layer Neural Network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron may be activated and output an output value obtained through an activation function.

A deep Neural Network with a plurality of hidden layers between the input layer and the output layer may be the most representative type of Artificial Neural Network which enables deep learning, which is one machine learning technique.

An ANN may be trained using training data. Here, the training may refer to the process of determining parameters of the Artificial Neural Network by using the training data, to perform tasks such as classification, regression analysis, and clustering of inputted data. Such parameters of the Artificial Neural Network may include synaptic weights and biases applied to neurons.

An Artificial Neural Network trained using training data may classify or cluster inputted data according to a pattern within the inputted data.

Throughout the present specification, an Artificial Neural Network trained using training data may be referred to as a trained model.

Hereinbelow, learning paradigms of an Artificial Neural Network will be described in detail.

Learning paradigms, in which an Artificial Neural Network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an Artificial Neural Network may be trained with training data that has been given a label.

Here, the label may refer to a target answer (or a result value) to be guessed by the Artificial Neural Network when the training data is inputted to the Artificial Neural Network.

Throughout the present specification, the target answer (or a result value) to be guessed by the Artificial Neural Network when the training data is inputted may be referred to as a label or labeling data.

Throughout the present specification, assigning one or more labels to training data in order to train an Artificial Neural Network may be referred to as labeling the training data with labeling data.

Training data and labels corresponding to the training data together may form a single training set, and as such, they may be inputted to an Artificial Neural Network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the Artificial Neural Network may derive a correlation function between the training data and the labeling data. Then, through evaluation of the function derived from the Artificial Neural Network, a parameter of the Artificial Neural Network may be determined (optimized).

Unsupervised learning is a machine learning method that learns from training data that has not been given a label.

More specifically, unsupervised learning may be a training scheme that trains an Artificial Neural Network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of Artificial Neural Networks using unsupervised learning include, but are not limited to, a generative adversarial network (GAN) and an autoencoder (AE).

GAN is a machine learning method in which two different Artificial Intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a Neural Network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One of semi-supervised learning techniques involves reasoning the label of unlabeled training data, and then using this reasoned label for learning. This technique may be used advantageously when the cost associated with the labeling process is high.

Reinforcement learning may be based on a theory that given the condition under which a reinforcement learning agent may determine what action to choose at each time instance, the agent may find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An Artificial Neural Network is characterized by features of its model, the features including an activation function, a loss function or cost function, a learning algorithm, an optimization algorithm, and so forth. Also, the hyperparameters are set before learning, and model parameters may be set through learning to specify the architecture of the Artificial Neural Network.

For instance, the structure of an Artificial Neural Network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an Artificial Neural Network. Learning in the Artificial Neural Network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an Artificial Neural Network rely not only on the structure and learning optimization algorithms of the Artificial Neural Network but also on the hyperparameters thereof. Therefore, in order to obtain a good learning model, it is important to choose a proper structure and learning algorithms for the Artificial Neural Network, but also to choose proper hyperparameters.

In general, the Artificial Neural Network is first trained by experimentally setting hyperparameters to various values, and based on the results of training, the hyperparameters may be set to optimal values that provide a stable learning rate and accuracy.

Figure 5:
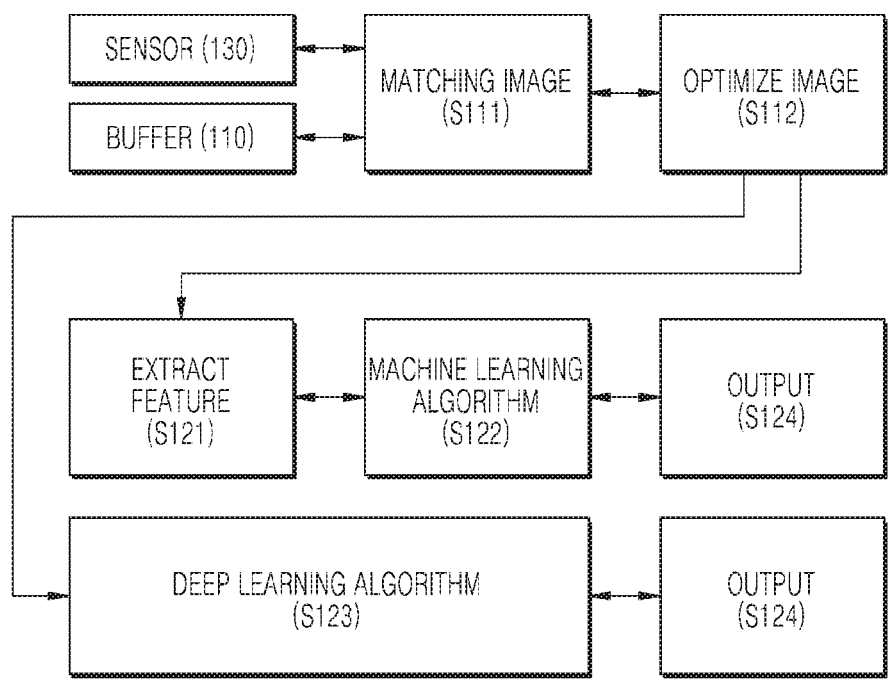
FIG. 5 is an exemplary diagram for explaining Artificial Intelligence-based eye tracking according to an embodiment of the present disclosure.

FIG. 5 is an exemplary diagram for explaining Artificial Intelligence-based eye tracking according to an embodiment of the present disclosure.

Referring to FIG. 5, a process of generating and learning the Artificial Intelligence model is shown. In the present disclosure, a Deep Learning algorithm among Machine Learning may be used to generate the Artificial Intelligence model for eye tracking. As the difference between the Machine Learning algorithm S122 and the Deep Learning algorithm S123, the Machine Learning requires a process of extracting feature separately S121, and the Deep Learning searches for the feature within the Artificial Neural Network constituting the Deep Learning even without extracting the feature separately.

A plurality of user images having photographed the user's face are input by using the sensor 130, and the captured image of the screen of the display 105 is input through the buffer 110. The buffer 110 is a kind of memory in the user terminal 100. The captured image includes the gaze information of the user. The captured image is referred to as the gaze image.

According to an embodiment of the present disclosure, a single system for acquiring the user image and the gaze image at the same time zone may be conceived. The cursor of the mouse moves on the screen of the display 105 at various speeds and directions according to the predetermined program. The user watches the moving cursor of the mouse, and the user's gaze changes along the trajectory of the mouse. The user image and the gaze image are acquired at the same time zone in the situation where the user watches the moving cursor of the mouse. Then, each frame of the acquired user image and gaze image are matched with each other on a one-to-one basis S111. If necessary, the user terminal 100 may optimize the matched image S112.

The matched image is used as an input of the Artificial Intelligence model generated by using the Machine Learning algorithm through the process of extracting the feature S121 or as an input of the Artificial Neural Network generated by using the Deep Learning algorithm. Through this input process, the Artificial Intelligence model or the Artificial Neural Network is learned.

Figure 6:
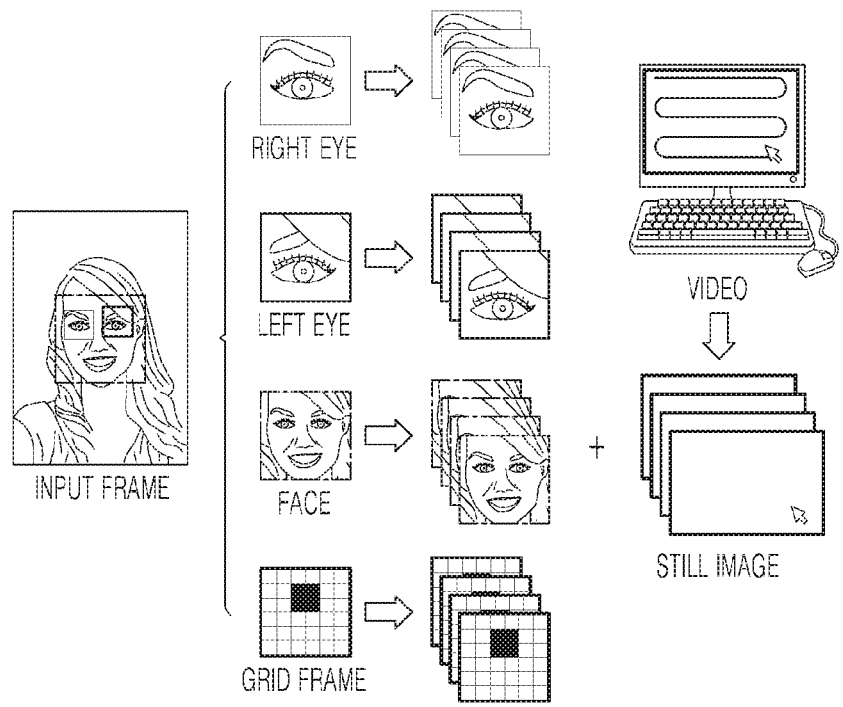
FIG. 6 is an exemplary diagram showing learning of an Artificial Intelligence model according to an embodiment of the present disclosure.

FIG. 6 is an exemplary diagram showing learning of the Artificial Intelligence model according to an embodiment of the present disclosure.

Referring to FIG. 6, a process of matching the user image with the gaze image is illustrated. The user image corresponding to the still image is collected from the video image. Then, the features of the right eye, the left eye, and the face may be conceived from the user image. In this case, the direction, size, and shape of the right eye, the left eye, and the face may be conceived relative to the grid frame input together. The gaze image corresponding to the still image is collected from the video image provided from the buffer. Then, the learning data of the Artificial Intelligence is generated by matching the user image and the gaze image generated at the same time zone with each other.

The Artificial Intelligence model or the Artificial Neural Network conceives the feature of the user in the corresponding gaze area through the analysis of the input matching image. For example, the Artificial Intelligence model or the Artificial Neural Network may conceive the angle at which the user's gaze changes according to the distance between the user and the screen of the display. In addition, the Artificial Intelligence model or the Artificial Neural Network may conceive the range in which the user's gaze changes according to the direction and position of the user's face.

Figure 7:
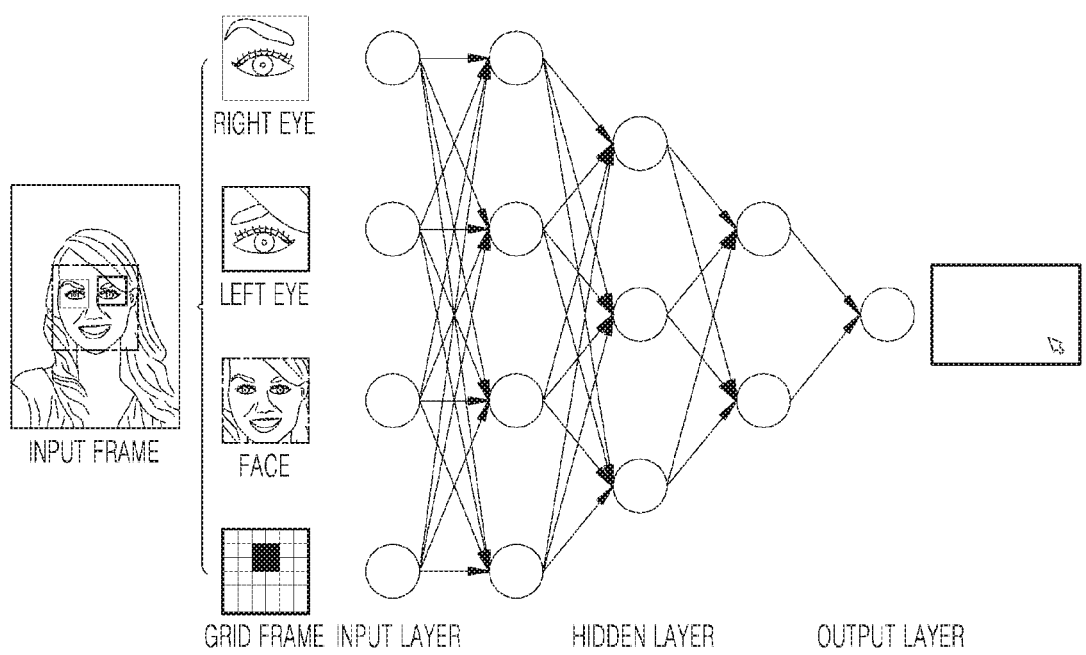
FIG. 7 is an exemplary diagram of an Artificial Intelligence neural network according to an embodiment of the present disclosure.

FIG. 7 is an exemplary diagram of the Artificial Intelligence Neural Network according to an embodiment of the present disclosure.

Referring to FIG. 7, when the image of the user's face is input through training through a large amount of learning data in which the user image and the gaze image have been matched with each other, the Artificial Neural Network tracks the area where the user's gaze reaches on the screen of the display 105. This user's eye tracking is performed through an input layer, a plurality of hidden layers, and an output layer. For example, when the CNN is used, the image of the user's face input through the hidden layer is divided into a convolution feature map through a convolution operation, and the user's gaze is determined through a fully connected layer through a sub sampling and a plurality of convolution operation processes.

Figure 8A:
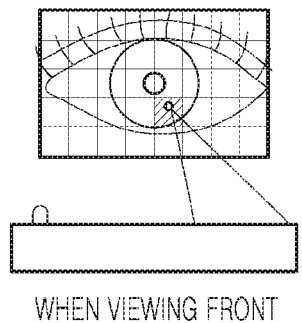
FIGS. 8A, 8B, and 8C are exemplary diagrams of learning data of the Artificial Intelligence model according to an embodiment of the present disclosure.
Figure 8B:
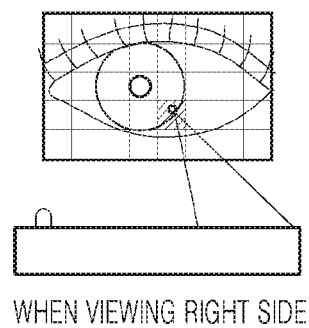
Figure 8C:
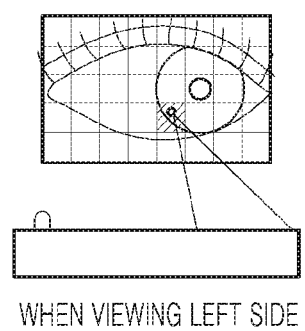

FIGS. 8A, 8B, and 8C are exemplary diagrams of learning data of the Artificial Intelligence model according to an embodiment of the present disclosure.

Referring to FIGS. 8A, 8B, and 8C, a person's eyes are shown. The contour of the whole eye, eyebrows, and eyelids are displayed in the square grid. The inside of the contour of the whole eye shows a white sclera, a light brown iris therein, and a dark brown pupil therein. Then, the light brown iris shows a Gaze Reflection Point (GRP) generated in the cornea.

FIG. 8A shows the shape of the eye when viewing the front, FIG. 8B shows the shape of the eye when viewing the right side of the user, and FIG. 8C shows the shape of the eye when viewing the left side of the user. In the three drawings, the relative positions of the GRP and the pupil appear differently according to the direction of the user's gaze.

Figure 9A:
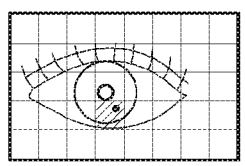
FIGS. 9A and 9B are exemplary diagrams of learning data of the Artificial Intelligence model according to an embodiment of the present disclosure.
Figure 9B:
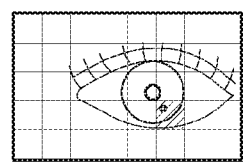

FIGS. 9A and 9B are exemplary diagrams showing learning data of the Artificial Intelligence model according to an embodiment of the present disclosure.

Referring to FIGS. 9A and 9B, two shapes of person's eyes are shown. FIG. 9A shows the eye shape of the user's gaze in the right-side rotation state of the head, and FIG. 9B shows the eye shape of the user's gaze in the left-side rotation state of the head. In the two drawings, the positions of the contours of the eyes relative to the grid appear differently according to the direction of the user's head.

As described above, according to an embodiment of the present disclosure, at least one of the distance information between the user and the screen of the display, and the information on the direction, shape, and size of the face together with the shapes of the right eye and left eye of the user may be conceived from the plurality of user images having photographed the user's face.

Figure 10:
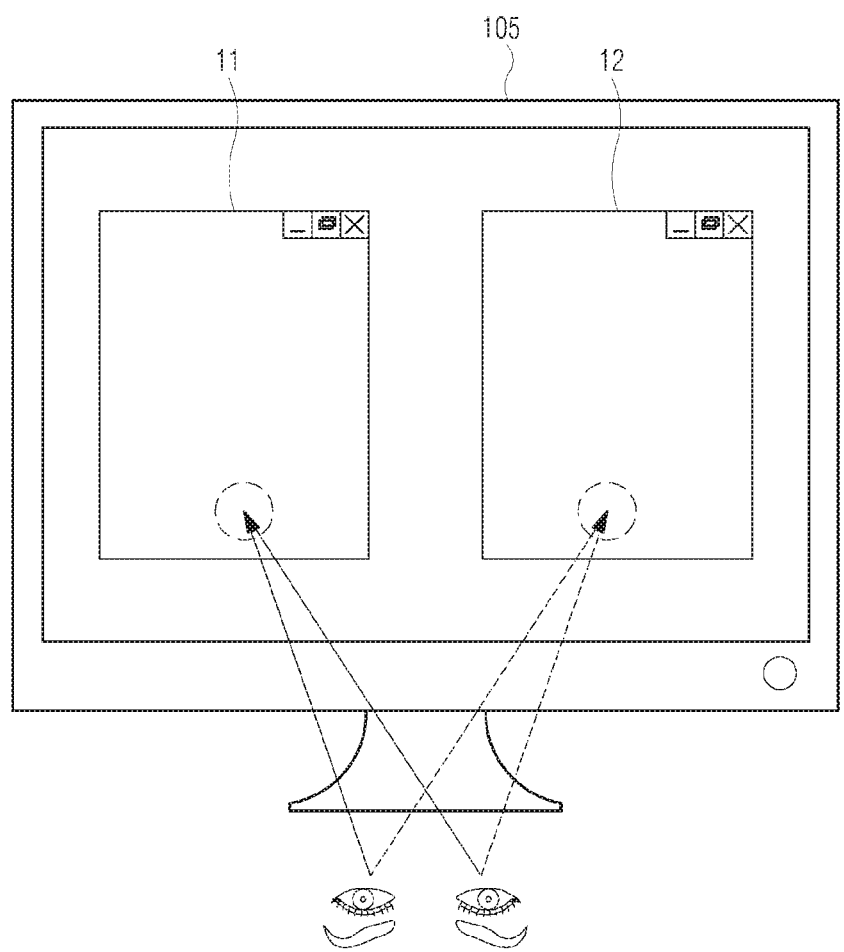
FIG. 10 is an exemplary diagram of the display control according to an embodiment of the present disclosure.

FIG. 10 is an exemplary diagram of a display control according to an embodiment of the present disclosure.

Referring to FIG. 10, a screen configuration of the display 105 is shown. The display 105 corresponds to an output apparatus of a computer corresponding to the user terminal 100.

The display control apparatus 101 according to an embodiment of the present disclosure may control the display by manipulating the control element related to the gaze information among the control elements included in the display information. Herein, the display information may include window user interface information. In FIG. 10, two windows 11, 12 are displayed on the left and right sides of the screen. That is, it may be seen that two windows are in an opened state as window user interface information. In this case, the display control apparatus 101 may control the display 105 so that the brightness of the window disposed in the gaze area is displayed brighter or darker than other window areas by using the window UI information.

Figure 11:
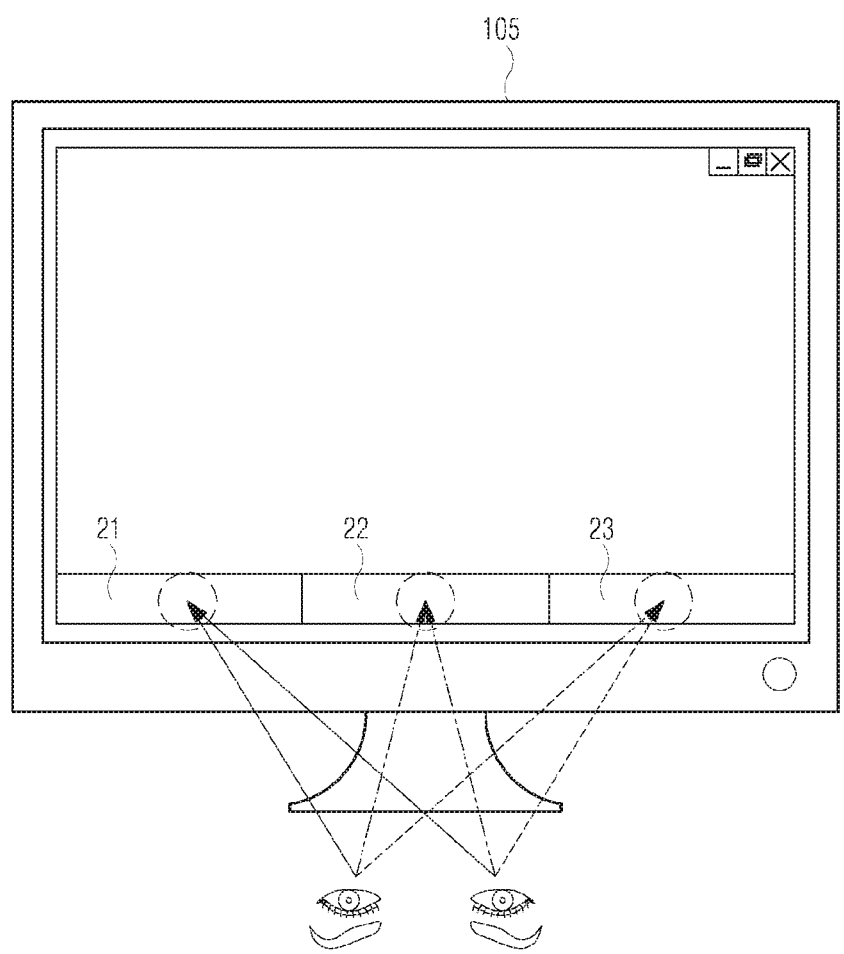
FIG. 11 is an exemplary diagram of the display control according to an embodiment of the present disclosure.

FIG. 11 is an exemplary diagram of a display control according to an embodiment of the present disclosure.

Referring to FIG. 11, three open windows 21, 22, 23 are displayed on the screen of the display 105 in a superimposed state. In this case, the display control apparatus 101 may control the switching of an active window in the maximum size state by using the window UI information. When analysis is required while switching windows of a screen size by using the single display 105, the switching of a plurality of windows may be controlled by the user's gaze.

Figure 12:
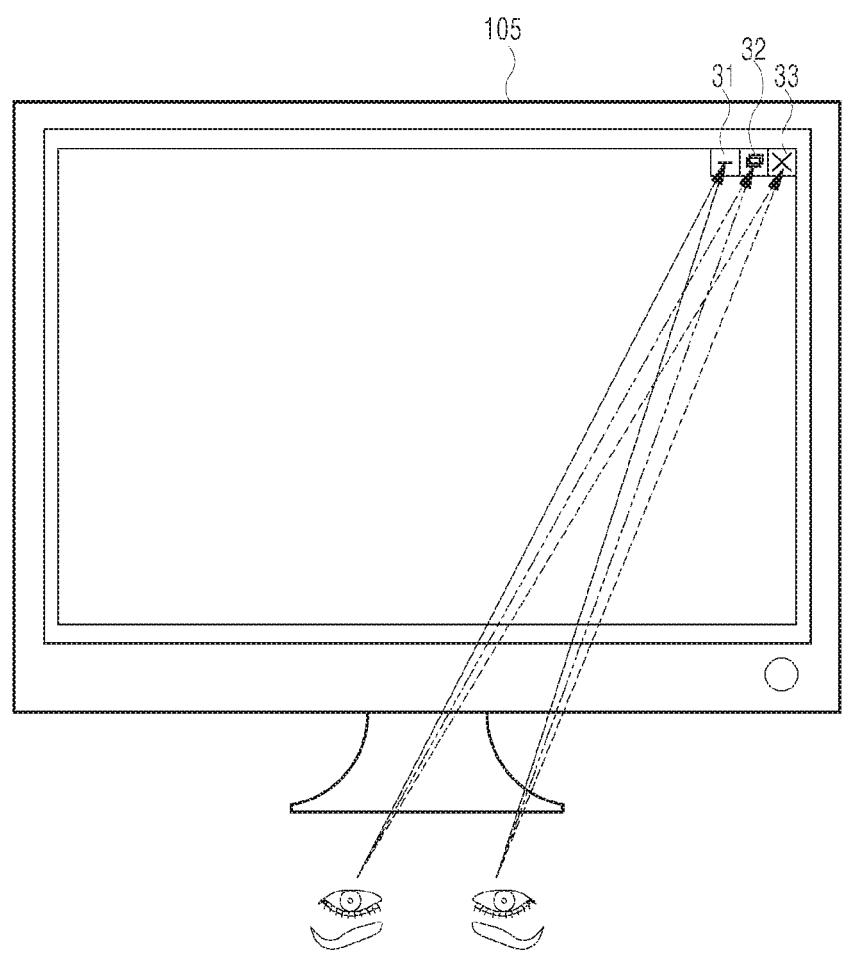
FIG. 12 is an exemplary diagram of the display control according to an embodiment of the present disclosure.

FIG. 12 is an exemplary diagram of a display control according to an embodiment of the present disclosure.

Referring to FIG. 12, one open window is displayed on the screen of the display 105. In this case, the display control apparatus 101 may control the shape of the window, for example, enlarge/reduce or hide or close the window by using window control icons 31, 32, 33 among the window UI information. In this case, the user's wink behavior may be used as a user's input for window control. That is, in a state where the user's gaze has been disposed on the window control icon, the user's wink may be used as the mouse click to control the shape of the window.

As described above, it is possible to achieve the eye tracking technology by using the simple equipment and the public programming interface through various embodiments of the present disclosure.

In addition, it is possible to automatically perform the image processing operations on the eye tracking, which has been performed manually by a person.

According to an object of the present disclosure, it is possible to control the operation of the window on the screen of the display as well as simply performing the display control.

The embodiments of the present disclosure described above may be embodied in the form of a computer program that may be executed through various components on a computer, and the computer program may be recorded on a computer-readable medium. At this time, the medium may include a magnetic medium such as a hard disk, a floppy disk, and a magnetic tape, an optical recording medium such as a CD-ROM and a DVD, a magneto-optical medium such as a floptical disk, and a hardware apparatus specially configured to store and execute program instructions such as a ROM, a RAM, or a flash memory.

Meanwhile, the computer program may be designed and configured specifically for the present disclosure or may be known and used by those skilled in the computer software field. Examples of computer programs may include not only machine language code such as those produced by a compiler, but also high-level language code that may be executed by the computer by using an interpreter, etc.

The use of the terms 'the' and the indication terms similar thereto in the specification of the present disclosure (particularly, in the claims) may refer to both singular and plural. In addition, when describing a range, the present disclosure includes the disclosure to which the individual values belonging to the above range are applied (unless there is contradiction thereto), and is the same as describing each individual value constituting the above range in the detailed description of the disclosure.

Unless there is explicitly stated or contrary to the description of the order of the steps constituting the method according to the present disclosure, the steps may be performed in a suitable order. The present disclosure is not necessarily limited to the order of description of the steps. The use of all examples or exemplary terms (e.g., etc.) in the present disclosure is merely for describing the present disclosure in detail and the scope of the present disclosure is not limited by the examples or the exemplary terms unless it is limited by the claims. In addition, it may be appreciated by those skilled in the art that various modifications, combinations, and alterations may be made according to the design criteria and factor within the scope of the appended claims or equivalents thereof.

Therefore, the spirit of the present disclosure should not be construed as being limited to the above-described embodiments, and all scopes equivalent to the claims or equivalently changed therefrom as well as the claims described later fall within the scope of the spirit of the present disclosure.

What is claimed is:

1. A display control method, which is performed by a display control apparatus, the method comprising:
matching a plurality of user images having photographed the user's face with a plurality of images on which the user's gaze in different directions is displayed, respectively;
training, based on a result of the matching, an Artificial Intelligence model learned according to an Artificial Intelligence algorithm;
detecting gaze information of the user on a screen of a display through analysis of the plurality of matched images with respect to input of the user's face image watching the screen of the display; and
controlling the display by manipulating a control element related to the gaze information among control elements comprised in display information.

2. The display control method of claim 1,
wherein the display information comprises window User Interface (UI) information, and
wherein the controlling the display comprises controlling a brightness of a window disposed in a gaze area by using the window UI information.

3. The display control method of claim 1,
wherein the display information comprises window User Interface (UI) information, and
wherein the controlling the display comprises controlling switching of an active window among a plurality of windows by using the window UI information.

4. The display control method of claim 1,
wherein the display information comprises window User Interface (UI) information, and
wherein the controlling the display comprises controlling switching of an active window in a maximum size state by using the window UI information.

5. The display control method of claim 1,
wherein the display information comprises window User Interface (UI) information, and
wherein the controlling the display comprises controlling a shape of a window by using a window control icon among the window UI information.

6. The display control method of claim 5,
wherein a user's wink is used as a user's input for window control.

7. The display control method of claim 1,
wherein the display information comprises window User Interface (UI) information, and
wherein controlling the display comprises determining a window to be controlled based on the display information, and controlling the display by manipulating the control element related to the gaze information among the control elements of the window to be controlled.

8. The display control method of claim 1,
wherein the Artificial Intelligence model is trained based on the gaze information of the user moving in interlock with a cursor of a mouse on the screen of the display and the user images which the user watches the cursor of the mouse as a training data.

9. The display control method of claim 8,
wherein the Artificial Intelligence model
learns by matching the gaze information of the user moving in interlock with the cursor of the mouse on the screen of the display, and
at least one of a shape of the user's face or shapes of left eye and right eye pupils of the user watching the cursor of the mouse, and
tracks the user's gaze with respect to the input of the user's face image through the learning.

10. A display control apparatus comprising:
a controller for controlling an image processing, tracking gaze by using the processed image, and controlling a display by using gaze information according to eye tracking; and
a memory for storing an image processing program readable by a computer, an Artificial Intelligence program, and a display drive driver,
wherein the controller comprises a processor
for matching a plurality of user images having photographed the user's face with a plurality of images on which the user's gaze in different directions is displayed through the image processing program, respectively,
for training, based on a result of the matching, an Artificial Intelligence model learned according to an Artificial Intelligence algorithm,
for detecting gaze information of the user on a screen of a display through analysis of the plurality of matched images with respect to input of the user's face image watching the screen of the display, and
for controlling the display by manipulating a control element related to the gaze information among control elements comprised in display information through the display drive driver.

11. The display control apparatus of claim 10,
wherein the processor controls a window according to input of a user's wink.

12. The display control apparatus of claim 10,
wherein the processor generates data for learning the Artificial Intelligence model tracking the user's gaze by matching a display screen image on which the user's gaze is displayed by movement of a cursor of a mouse with the image of the user's face watching the cursor of the mouse.

13. The display control apparatus of claim 10,
wherein the display information comprises window User Interface (UI) information, and
wherein the processor determines a window to be controlled based on the display information, and controls the display by manipulating the control element related to the gaze information among the control elements of the window to be controlled.

14. The display control apparatus of claim 10,
wherein the Artificial Intelligence model is trained based on the gaze information of the user moving in interlock with a cursor of a mouse on the screen of the display and the user images which the user watches the cursor of the mouse as a training data.

15. The display control apparatus of claim 14,
wherein the Artificial Intelligence model
learns by matching the gaze information of the user moving in interlock with the cursor of the mouse on the screen of the display, and
at least one of a shape of the user's face or shapes of left eye and right eye pupils of the user watching the cursor of the mouse, and
tracks the user's gaze with respect to the input of the user's face image through the learning.

* * * * *